United States Patent [19]

Paulsen

[11] 4,253,104
[45] Feb. 24, 1981

[54] STRIP CHART RECORDER

[75] Inventor: Dean R. Paulsen, Danvers, Mass.

[73] Assignee: General Scanning, Inc., Watertown, Mass.

[21] Appl. No.: 96,625

[22] Filed: Nov. 23, 1979

[51] Int. Cl.³ .................. G01D 15/00; G01D 15/24
[52] U.S. Cl. .................................. 346/145; 346/136
[58] Field of Search ........................... 346/136, 145

[56] References Cited

U.S. PATENT DOCUMENTS

| | | | |
|---|---|---|---|
| 4,038,666 | 7/1977 | Fuller, Jr. | 346/136 |
| 4,042,939 | 8/1977 | Lloyd et al. | 346/145 X |
| 4,053,900 | 10/1977 | Strange | 346/136 |

*Primary Examiner*—George H. Miller, Jr.

[57] ABSTRACT

A strip chart recorder having cantilevered spring arms integrally molded with its rigid chassis. One set of spring arms maintains pressure on a paper drive nip, another set permits resilient deflection of a rod to latch a paper supporting door, and a third set resiliently retains the paper supply roll. Improved drive is obtained by movable mounting of the drive roll in a special relationship that causes it to react to resistance of the paper by tightening the drive nip pressure.

19 Claims, 13 Drawing Figures

STRIP CHART RECORDER

BACKGROUND OF THE INVENTION

This invention relates to strip chart recorders for recording traces representing electrical signals, such as are used in medical and scientific applications. Such instruments include a pen or stylus driven in one dimension by a galvanometer motor responsive to the signal to be measured and a motor-driven drive roll for moving paper under the stylus in a direction perpendicular to the motion of the stylus, so that the paper provides a record of the stylus position, and therefore the signal, over time. The various elements including the stylus motor and the paper drive motor, and the drive roll are mounted on a rigid chassis.

Ordinarily, the paper drive includes a nip roll that is biased by a separate spring assembly against the drive roll to form the paper drive nip. An additional spring assembly is employed in the latch mechanism for securing the door of the paper supply compartment. These constructions require numerous separate parts and careful assembly procedures.

SUMMARY OF THE INVENTION

It has been discovered that, by molding cantilevered arms as integral parts of a molded plastic chassis for a strip chart recorder, both a suitably rigid chassis and a simple, less costly, effective spring bias with a minimum number of parts can be achieved. The specific elements that are spring biased according to this invention are a drive nip, a rod that latches a door to a paper storage recess and acts as a paper guide at the writing edge, and the means for removably mounting the paper supply roll.

In the preferred embodiment the paper drive of the recorder is a drive nip having a motor-driven drive roll mounted parallel to a nip roll, the two rolls being spring-biased together. The recorder chassis is of molded construction of substantially rigid resinous material with a pair of elongated, spaced-apart parallel spring arms integrally molded with the chassis. Each of the arms extends from a root region integral with the chassis to a free end. One of the rolls of the drive nip is mounted at its opposite ends to the respective free ends of the arms. The other roll is positioned against the first roll to resiliently deflect the arms, so that the arms provide spring bias for the drive nip.

In the preferred embodiment the chassis also has a recess for storing a supply of paper and a hinged member for providing access to the recess. The hinged member has at least one inclined cam extension with a notch cooperating with a latching rod. The rod is mounted at its end to the respective free ends of a pair of spaced-apart parallel spring arms molded integrally with the chassis, each extending from a root region integral with the chassis to its free end. The rod is positioned directly below the stylus whereby closing the hinged member causes the cams to move the rod upward, deflecting the spring arms. The rod thus moves the stylus upward and clear of the hinged member until the latching rod reaches cooperating notches on the cams. At this point the rod is forced by the spring action of the arms into the notches.

In preferred embodiments, the drive roll is attached to the spring arms, each arm extending at an acute angle to the line of centers between the drive and nip rolls, and the rolls are positioned so that increased drag on the paper causes the drive roll to increase the pressure on the drive nip.

Also in preferred embodiments, the chassis forms a housing with substantially planar walls of generally uniform thickness, the arms are oriented parallel to and substantially co-planar with the walls, and the walls have openings to permit displacement of the arms in the plane of the walls. The root regions are thickened relative to the thickness of the housing walls. Preferably, the arms are tapered in the cross section taken in the plane of displacement, each arm being thicker at its end closer to the root region than at its free end. The hinged member has a curved surface for guiding the paper and at least two cams extending perpendicular to the guide surface. The chassis, root regions, and arms are composed of resinous material preferably, but not limited to, polycarbonate.

Preferably the recorder includes molded cantilevered spring arms, integral with the chassis, that are positioned to be sprung apart and are arranged to receive and hold therebetween a paper supply roll.

According to another aspect of the invention the drive roll of the recorder drive nip has freedom to move in a path which intersects with the position occupied by the nip roll on the intake side of the nip roll, and the drive roll is responsive to its driving torque and drag resistance upon the paper being fed to move along the path in the direction against the nip roll, with increases of drag resistance upon the paper, thereby to increase the pressure of the drive roll against the nip roll, and thereby against the paper, to increase the driving force applicable to the paper.

Preferably the drive roll is mounted at its opposite ends to arms that have freedom to rotate to swing the drive roll along the path, these arms preferably comprising cantilever springs molded integrally with the chassis of the recorder.

Preferably, the drive roll is mounted on the side of the paper corresponding to the side on which its drive motor is located, and a drive belt extends from the motor to the drive roll, the belt being within the confines of the space defined by plans perpendicular to the paper projected through the edges of the paper.

PREFERRED EMBODIMENT

The structure and operation of a preferred embodiment of the invention will be explained after briefly describing the drawings.

STRUCTURE

Figure 1:
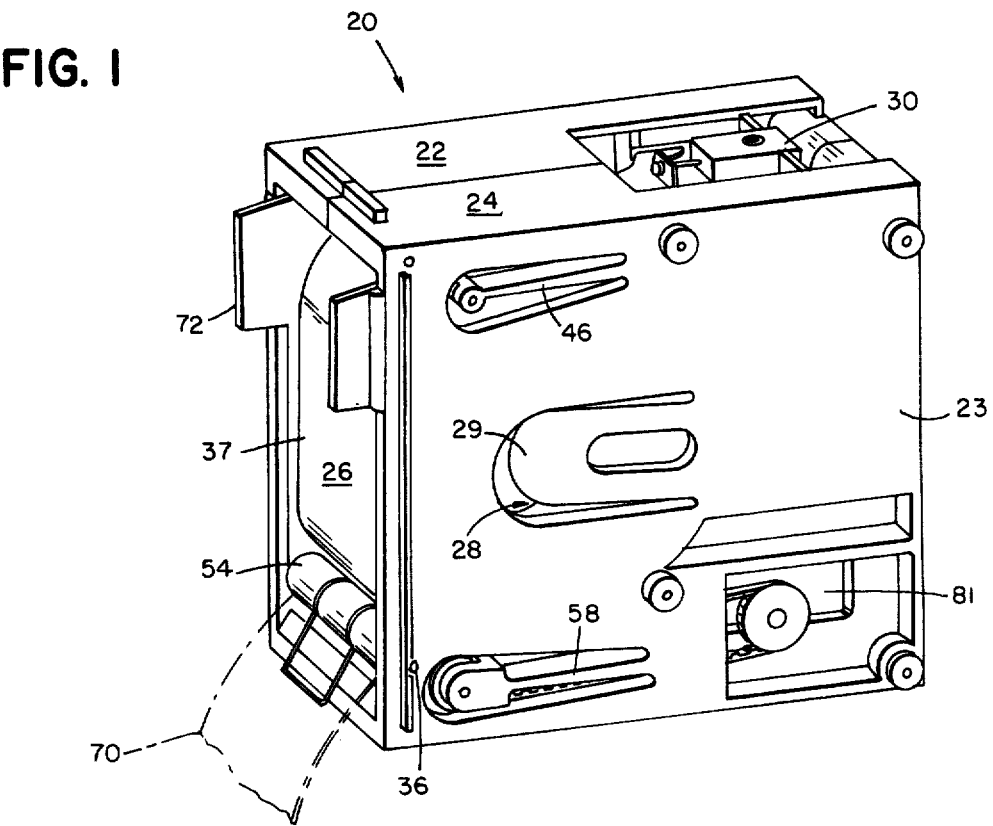
FIG. 1 is a perspective of the recorder.
Figure 1A:
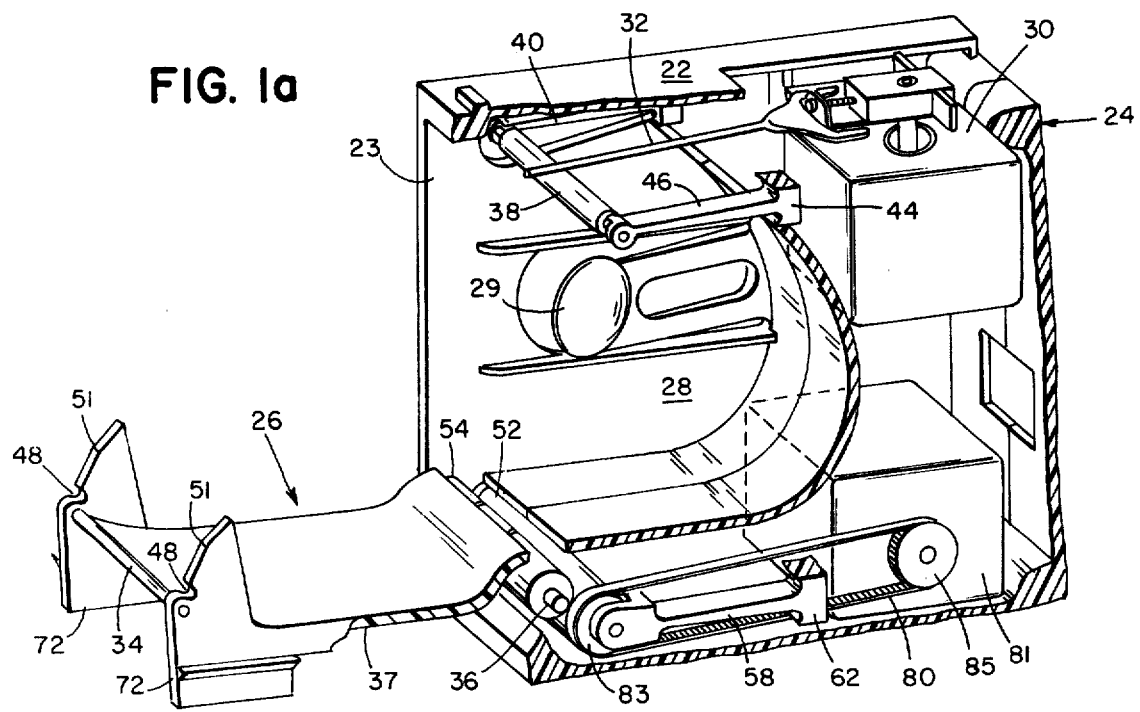
FIG. 1a is a perspective of the recorder showing the door to the paper recess open with parts broken away.
Figure 2:
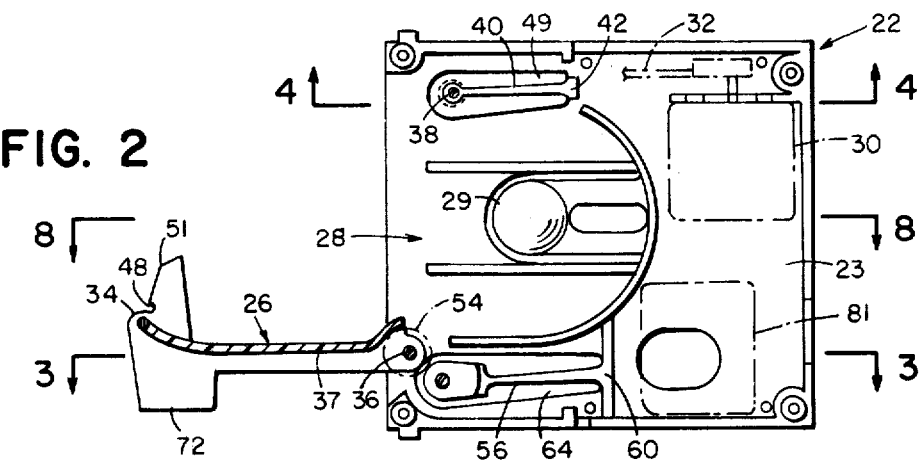
FIG. 2 is a view of the inside of one-half of the housing with parts removed.
Figure 4:
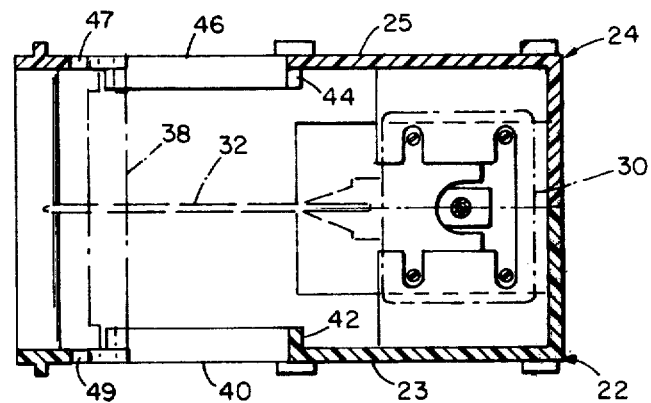
FIG. 4 is a section taken along 4—4 of FIG. 1.
Figure 3:
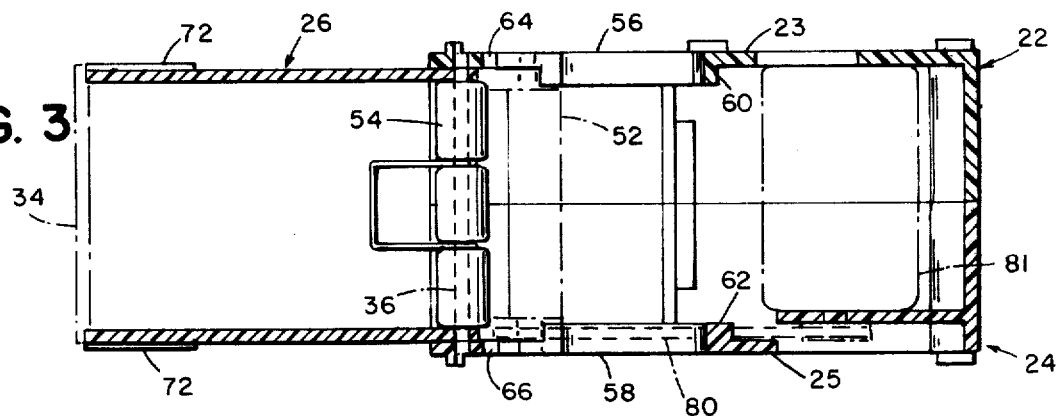
FIG. 3 is a section taken along 3—3 of FIG. 1.
Figure 8:
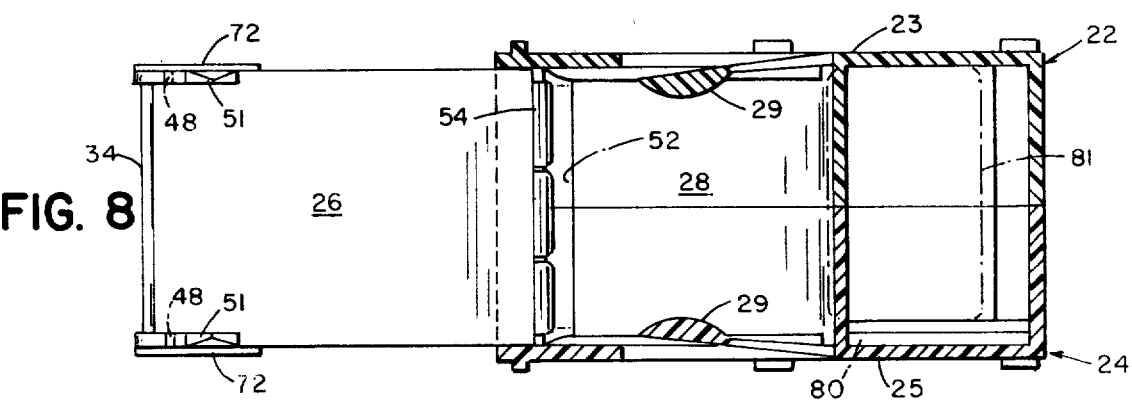
FIG. 8 is a section taken along 8—8 of FIG. 2.

Referring to the figures, the recorder chassis is a molded housing 20 having two halves 22 and 24 and a door 26 hinged by shaft 36 to provide access to paper storage recess 28. The housing supports various elements of the recorder including galvanometer motor 30 which drives stylus 32 back and forth in the horizontal plane, as shown, along writing edge 34 of door 26.

Drive nip 50 is formed by drive roll 52 and idler nip roll 54 which extend between walls 23 and 25 of housing halves 22 and 24. Drive roll 52 is on the side of paper 70 corresponding to the side on which motor 81 is located and is covered with an elastomeric material. A drive belt 80 is mounted so as not to extend beyond the edge of paper 70. Drive roll 52 is connected by belt 80 around pulleys 83 and 85 to drive motor 81. Drive roll 52 is mounted at its ends to cantilevered spring arms 56 and 58 which are molded integrally with their respective housing halves 22 and 24. Arms 20 at roots 60 and 62. Arms 56 and 58 are generally coplanar with walls 23 and 25, their outside surfaces being aligned with the plane of the outside surfaces of the walls. These arms 56 and 58 are free to be displaced in the plane of walls 23 and 25 in spaces 64 and 66 and are placed so that rolls 52 and 54 are forced against each other, deflecting these arms and providing spring bias for drive nip 50. Shaft 36 for nip roll 54 also acts as a hinge for door 26.

Figure 6:
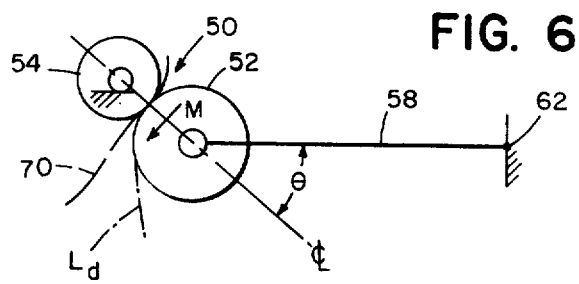
FIG. 6 is a diagram of the drive nip and spring.
Figure 5:
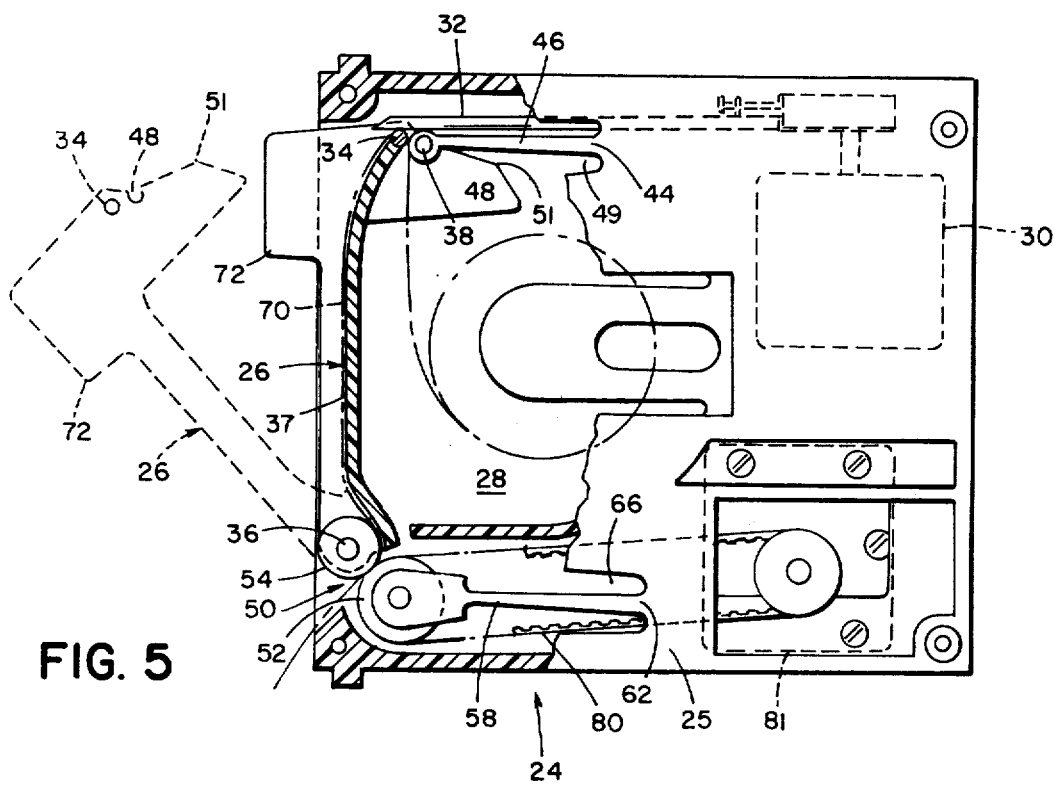
FIG. 5 is a side elevation with parts broken away showing the paper path.
Figure 7:
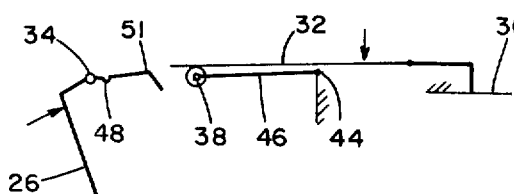
FIG. 7 is a side section showing the door open.
Figure 7A:
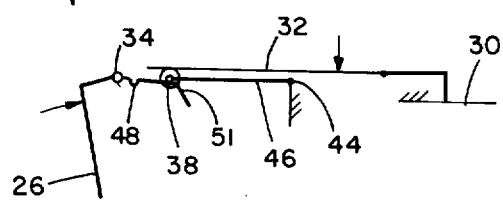
FIG. 7a shows the door closing.
Figure 7B:
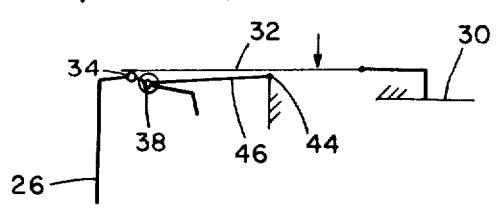
FIG. 7b shows the door closed.

As depicted best in FIG. 6, arms 56 and 58 extend at an acute angle $\theta$ to the line of centers between rolls 52 and 54, and the arms are positioned in respect of the direction of motion M of the point 62 of tangency between the rolls, so that the locus $L_d$ of drive roll positions (when unimpeded by the nip roll) as defined by the arms, intersects with the position occupied by nip roll 54 on the intake side of the nip roll. (For further description see the description "Self Energizing Drive" below).

Turning to the door to the paper recess, door 26 is latched in the closed position by latching rod 38 which cooperates with notches 48 in two angled cams 51 extending perpendicular to door 26. Cantilevered arms 40 and 46 are integrally molded with respective housing halves 22 and 24, extending from those halves at root regions 42 and 44. Similar to arms 56 and 58, arms 40 and 46 are coplanar with walls 23 and 25 and are free to be displaced in spaces 49 and 47 in the plane of walls 23 and 25 respectively. Rod 38 is mounted at its opposite ends to the respective free ends of cantilevered arms 40 and 46, providing freedom of motion to allow it to be cammed upwardly and providing spring bias to hold rod 38 in notches 48. The outside surface of door 26 is formed into a guide path 37. Door 26 has two pulls 72 extending perpendicular to guide surface 37 at the top of the surface.

Stylus 32 is biased downwardly, and when door 26 is closed stylus 32 rests on writing edge 34. When door 26 is fully opened so that latch rod 38 is in its unbiased position, the stylus 32 rests on latch rod 38.

Integrally molded spring arms 40, 46, 50, and 58 have dimensions in the direction of thickness of the housing walls greater than the thickness of said walls. The root regions of the arms are also thickened to increase the amount of material that absorbs the stress of the spring action. The housing walls are approximately 0.1 inch thick. The arms are approximately 0.25 inch thick in the dimension perpendicular to the plane of displacement, approximately 1.6 inch long, and tapering in dimension in the plane of displacement from 0.1 inch to 0.25 inch. The root regions are approximately 0.25 inch thick. The housing, root region and arm are composed of 20 percent glass reinforced polycarbonate.

In the preferred embodiment of the drawings the free ends of arms 56 and 58 that support drive roll 52 are constructed to deflect in use a distance greater than the minimum of 0.100 inch to accommodate the manufacturing tolerances of the drive and nip rolls and their shafts, the tolerance in the center distance between the two rolls, allowance for preload of the rolls together (e.g. 0.025 inch) and clearance to allow paper jams to pass between the rolls (e.g., 0.050 inch).

Specifications and tolerances are as follows:
Drive roll spring arms 56, 58:
a. spring rate: 5 lbs/in.
b. Max. thick.: 0.100 in.
c. Min. thick.: 0.050 in.
Latch spring arms 40, 46:
a. Spring rate: 11 lbs/in.
b. Max thick.: 0.100 in. (at point where radius is tangent to straight section)
c. Min. thick.: 0.050 in.
Paper retainer spring arms 31, 33:
a. Spring rate: 17 lbs/in.
b. Max. thick.: 0.085 in.
c. Min. thick.: 0.050 in.

Flexural modulus of 20 percent glass reinforced polycarbonate: $6 \times 10^5$ psi.
Maximum stress at root region ($\partial = Mc/I$):
a. Latch Spring arms: 2,600 psi
b. Drive roller spring arms: 1,800 psi
c. Paper retainer spring arms: 10,000 psi

SELF-ENERGIZING DRIVE

As will be seen, the specific paper drive of the embodiment is an example of the drive roll being mounted with freedom to move in a path which intersects with the position occupied by the nip roll on the intake side of the nip roll. This roll is responsive to its driving torque and drag resistance upon the paper being fed, to move along this path in the direction against the nip roll. Increase of the drag resistance upon the paper thus will increase the pressure of the drive roll against the nip roll, and thereby against the paper, to increase the driving force applicable to the paper.

Figure 9:
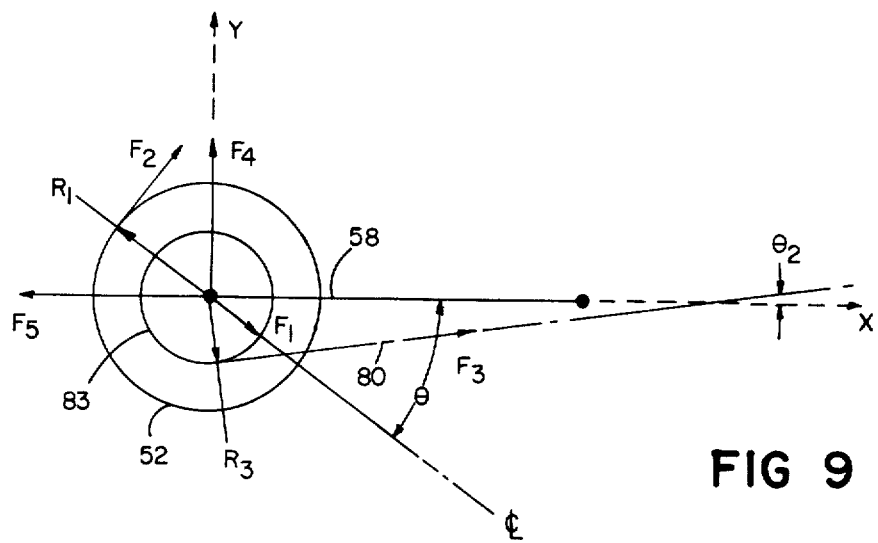
FIGS. 9 and 10 are diagrams similar to FIG. 6, used to define the parameters used in the mathematical description of the self-energizing drive.

To explain the self-energizing drive in more technical terms, we first consider FIG. 9, a free-body diagram of the drive roller.

Torque equilibrium about its axis of rotation requires $$F_3 R_3 = F_2 R_1 \qquad \text{Eq. 1}$$

Force equilibrium about the y axis requires $$F_{1y} = F_{2y} + F_{3y} + F_{4y} + F_{5y} \qquad \text{Eq. 2}$$
$$F_{1y} = F_1 \sin \theta$$
$$F_{2y} = F_2 \cos \theta$$
$$F_{3y} = F_3 \sin \theta_2$$
$$\text{where } \theta_2 = \theta_1 + \sin^{-1} \frac{R_3 - R_2}{L}$$
$$F_{4y} = F_4 \qquad F_{5y} = 0$$

Figure 10:
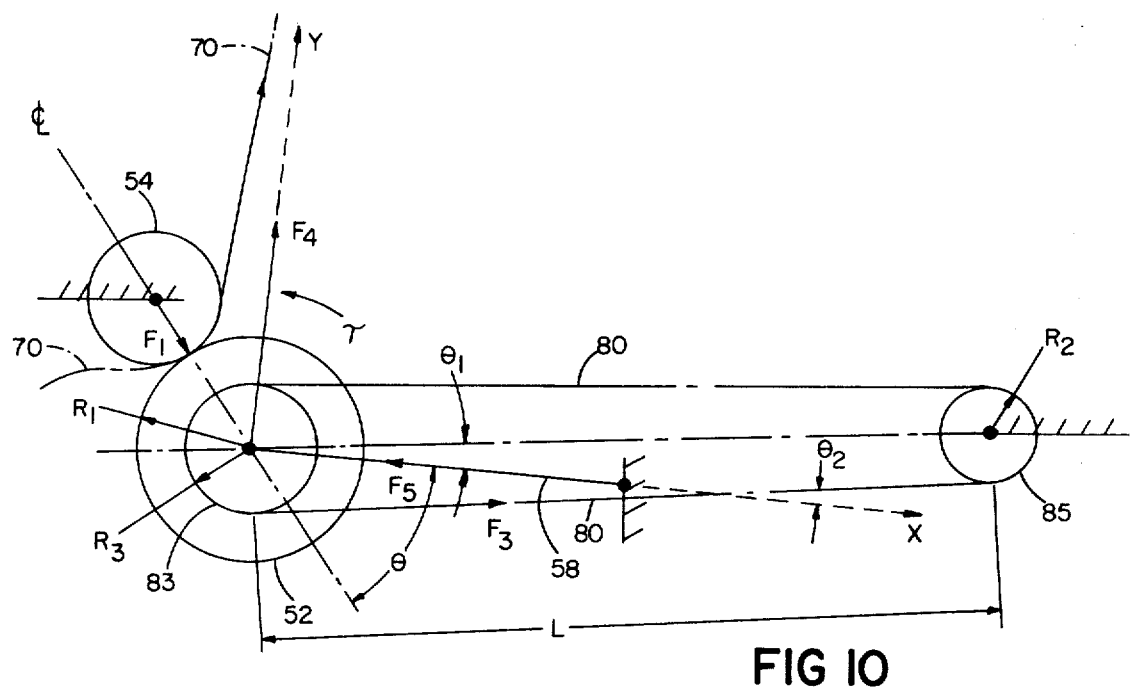

The symbols in these equations and in FIG. 9 are further defined in FIG. 10, in respect of the preferred embodiment, as follows:
70—paper 54—idler roller
52—drive roller
58—radius arm
62—pivot point
80—drive belt
83—drive roller pulley
85—motor pulley
Y—torque applied to drive roller
$R_1$—radius of drive roller
$R_2$—radius of motor pulley
$R_3$—radius of drive roller pulley
L—length of belt between points where it becomes tangent to motor pulley 83 and to drive roller pulley 85.
$F_1$—force holding paper against drive roller
$F_2$—pulling force on paper
$F_3$—force applied to drive roller pulley (83) by drive belt (80)
$F_4$—force preloading nip rolls
$F_5$—reaction force applied to drive roller (52) by radius arm (58)
$\theta_1$—angle between radius arm and line of centers between motor pulley and drive pulley (positive as shown in FIG. 10)
$\theta$—angle between line of centers of the rollers and the radius arm Substituting the value of $F_3$ given by Eq. 1 into Eq. 2:

$$F_1 \sin\theta = F_2 \cos\theta + F_2 \frac{R_1}{R_3} \sin[\theta_1 + \sin^{-1}\frac{R_3 - R_2}{L}] + F_4$$

From which we get:

$$\frac{F_2}{F_1} = \frac{\sin\theta - F_4/F_1}{\cos\theta + \frac{R_1}{R_3}\sin[\theta_1 + \sin^{-1}\frac{R_3 - R_2}{L}]}$$

In order for the paper not to slip, $F_2/F_1$ must always be less than the friction factor f; therefore, the design must satisfy:

$$\frac{\sin\theta - F_4/F_1}{\cos\theta + \frac{R_1}{R_3}\sin[\theta_1 + \sin^{-1}\frac{R_3 - R_2}{L}]} < f$$

For very small values of $\theta_1$ and $F_4$, and for $R_3 = R_2$, the above simplifies to $$\tan\theta < f$$

which is useful in arriving at a first choice for the value of $\theta$.

Operation

As indicated, galvanometer motor 30 drives stylus 32 responsive to the signal to be recorded. The drive motion for stylus 32 is in one dimension, along writing edge 34 of door 26. Paper 70 moving at right angles to the stylus motion across writing edge 34 is marked by stylus 32, providing a record of the position of the stylus, and therefore the signal to be recorded, over time. Motor 81 drives belt 80 to turn drive roll 52 at nip 50. Paper is driven by drive nip 50 and moves along a path from recess 28, between rod 38 and edge 34, down guide surface 37, between rolls 52 and 54, and out of the recorder.

The positioning of the drive and nip rolls is such that as drag increases on paper 70 from some external source, the reactive motion of drive roll 52 and arms 56 and 58 is in a direction that tends to shorten the length of the line of centers ℓ between rolls 52 and 54. Thus, as drag increases on the paper, the arms tend to increase the pressure of drive nip 50 on paper, tending to free the paper.

When it is necessary to obtain access to recess 28, for example to add paper, door 26 is opened, being hinged by rod 36. Opening is achieved by grasping pulls 72 and pulling outward from the recorder. Rod 38 is thereby pushed resiliently upward from notches 48 by cams 51 against spring bias from arms 40 and 46. As rod 38 moves upward it pushes stylus 32 upward so that the stylus clears writing edge 34 on door 26. Further opening of the door permits rod 38 to slide down the incline of cams 51 to an unbiased position immediately below the stylus.

Once door 26 is opened, a roll of paper with a cylindrical core can be inserted into recess 28. Walls 23 and 25 each have integrally molded spherical discs 27 and 29 at the respective ends of arms 31 and 33. The discs are spring biased by the arms in a direction perpendicular to the walls and toward the center of recess 28 whereby the discs cooperate with the core of the paper roll to hold it in place. After the paper is inserted, the door is closed to reverse the above process, so that the cams lift rod against the spring bias, in turn lifting stylus 32 clear of edge 34, until rod 38 is biased into cooperating notches 48 allowing stylus to rest on edge 34.

In the unstressed condition the cantilever arms 31 and 33 extend from their roots, at the housing wall plane, at a slight angle inwardly. When these arms are sprung apart to receive the paper core, they still remain within the boundary plane defined by the housing walls.

Other Embodiments

Other embodiments are within the following claims. For example, by varying the length, thickness, taper, and composition of the cantilevered arms, it is possible to control the spring constant of the arms. It is understood that the invention includes, without limitation other resinous materials, other configurations of arms, and other configurations of root regions of the arms to accommodate the specific requirements of individual instruments. The molded housing can include features to permit the recorder to slide into a mounting bracket to permit easy attachment with other relevant instruments.

What is claimed is:

1. In a device for providing a recording trace of an electric signal on paper comprising a recording stylus driven by a galvanometer motor responsive to said signal, a paper drive to move the paper beneath said stylus;

and a chassis supporting said motor and drive in operable relation,
said chassis being of molded construction of substantially rigid resinous material, and including a pair of elongated, spaced apart, parallel, cantilevered spring arms molded integrally with said chassis, each of said arms extending from a root region integral with said chassis to a free end, said arms resiliently supporting an operative component of said recorder.

2. The recorder of claim 1 wherein said paper drive includes a motor-driven drive roll and a nip roll mounted parallel to said drive roll, said rolls being spring-biased together to define a drive nip for said paper, one of said rolls of said drive nip mounted at its opposite ends to the respective free ends of said molded cantilevered spring arms, the other of said rolls positioned against said roll in a manner resiliently deflecting said arms, whereby said arms provide spring bias for said nip.

3. The recorder of claim 2 wherein the drive roll is mounted on said molded spring arms, each of said arms extends at an acute angle to the line of centers between said drive and nip rolls, said arms positioned in respect to the direction of motion of said drive roll such that the locus of positions of the drive roll (when unimpeded by the nip roll), defined by said arms intersects with the position occupied by the nip roll on the intake side of the nip roll.

4. The recorder of claim 1 wherein said chassis has a recess for storing a supply of paper, a hinged member for providing access to the paper supply recess, and a latching rod to secure the hinged member, the hinged member having at least one inclined cam that includes a notch cooperating with the latching rod, said latching rod mounted at its ends to the respective ends of said molded cantilevered spring arms so as to permit resilient displacement of said rod, said rod being positioned directly below said stylus, whereby closing the hinged member causes the cams to deflect the latching rod upward against the stylus moving the stylus upward and clear of the hinged member until the latching rod is forced by the spring action of the arms into the cooperating notches on the cams.

5. The recorder of claim 4 wherein the hinged member comprises a curved surface for guiding the paper and at least two of said cams, said cams extending perpendicular to the guide surface and arranged to engage said rod at positions generally corresponding to the positions of said cantilevered spring arms.

6. The recorder of any of the claims 1–5 wherein said chassis forms a housing, said housing having substantially planar parallel walls of generally uniform thickness, said elongated arms being parallel to and substantially co-planar with said walls, said walls having openings to permit displacement of said arms in the plane of said walls.

7. The recorder of claim 6 wherein said root regions are thickened relative to the thickness of said housing walls.

8. The recorder of claim 6 wherein said arms are tapered in cross-section taken in the plane of displacement, each arm being thicker at its end closer to the root region than at its free end, said arms further having dimensions in the direction of thickness of said housing walls that is greater than the thickness of said walls.

9. The recorder of claim 8 wherein the walls of said housing are approximately 0.1 inch thick, said arms are approximately 0.25 inch thick in the dimension perpendicular to the plane of displacement, approximately 1.6 inch long, and tapering in thickness in the plane of displacement from 0.1 inch to 0.05 inch, said root region being approximately 0.25 inch thick.

10. The recorder of claim 1 wherein said molded cantilevered spring arms are positioned to be sprung apart and are arranged to receive and hold therebetween a paper supply roll.

11. The recorder of claim 10 wherein said chassis forms a housing, said housing having substantially planar parallel walls of generally inform thickness, said elongated arms being generally parallel to and substantially co-planar with said walls, said walls having openings to permit displacement of said arms perpendicular to the plane of said walls.

12. The recorder of claim 11 wherein said root regions are wider in the plane of said housing walls than the width of said arms near their ends.

13. The recorder of claims 1, 2, 4 or 10 wherein the chassis, root region and arms are composed of polycarbonate.

14. The recorder of claims 1, 2, 4 or 10 wherein said molded chassis is comprised of two molded halves joined together.

15. In a device for providing recording trace of an electric signal on paper comprising a recording stylus driven by a galvanometer motor responsive to said signal, a paper drive to move the paper beneath said stylus, and a chassis supporting said motor and drive in operable relation, said chassis being of molded construction of substantially rigid resinous material, and including three pairs of elongated, spaced apart, parallel, cantilevered spring arms molded integrally with said chassis, each of said arms extending from a root region integral with said chassis to a free end, said paper drive including a motor-driven drive roll and a nip roll mounted parallel to said drive roll, said rolls being spring-biased together to define a drive nip for said paper, one of said rolls of said drive nip mounted at its opposite ends to the respective free ends of one pair of said molded arms, the other of said rolls positioned against said roll in a manner resiliently deflecting said arms, whereby said arms provide spring bias for said nip, said chassis having a recess for storing a supply of paper, a hinged member for providing access to the paper supply recess, and a latching rod to secure the hinged member, the hinged member having at least one inclined cam that includes a notch cooperating with the latching rod, said latching rod mounted at its ends to the respective ends of a second pair of said molded cantilevered spring arms so as to permit resilient displacement of said rod, said rod being positioned directly below said stylus, whereby closing the hinged member causes the cams to deflect the latching rod upward against the stylus moving the stylus upward and clear of the hinged member until the latching rod is forced by the spring action of the arms into the cooperating notches on the cams, said third pair of molded cantilevered spring arms being positioned to be sprung apart and arranged to receive and hold therebetween a paper supply roll.

16. The recorder of claim 15 wherein said chassis forms a housing, said housing having substantially planar parallel walls of generally uniform thickness, said elongated arms being parallel to and substantially co-planar with said walls, said walls having openings to permit displacement of said arms.

17. In a device for providing a recording trace of an electric signal on paper comprising a chassis, a recording stylus driven by a galvanometer motor responsive to said signal, and a paper drive to move the paper beneath said stylus;

said paper drive including a motor-driven drive roll and a nip roll mounted parallel to said drive roll, said rolls defining a drive nip for said paper, said drive roll being mounted with freedom to move in a path which intersects with the position occupied by the nip roll on the intake side of the nip roll, and said roll being responsive to its driving torque and drag resistance upon the paper being fed, to move along said path in the direction against said nip roll, with increase of said drag resistance upon said papers, thereby to increase the pressure of said drive roll against said nip roll, and thereby against said paper, to increase the driving force applicable to said paper.

18. The recorder of claim 17 wherein said drive roll is mounted at its opposite ends to arms, said arms having freedom to rotate to swing said drive roll along said path.

19. The recorder of claim 18 wherein said arms comprise cantilevered springs.

* * * * *